Feb. 18, 1969   L. J. HAULIK ET AL   3,428,339
PIPE COUPLING
Filed Feb. 7, 1966

INVENTORS
LEO J. HAULIK
JAMES G. BRADBURY
BY LEONARD S. GREER
CLARENCE W. DECKER

Charles L. Lovercheck
atty.

United States Patent Office 3,428,339
Patented Feb. 18, 1969

3,428,339
PIPE COUPLING
Leo J. Haulik, James G. Bradbury, Leonard S. Greer, and Clarence W. Decker, all of Erie, Pa., assignors to Hays Manufacturing Company, Erie, Pa., a corporation of Pennsylvania
Filed Feb. 7, 1966, Ser. No. 525,711
U.S. Cl. 285—94                    10 Claims
Int. Cl. F16l 25/00, 55/00

ABSTRACT OF THE DISCLOSURE

A compression type coupling having a sealing washer. The sealing washer has abrasive particles embodied in its inner peripherial surface around approximately half of its length. The other half of the length of the sealing washer has a surface adapted to form a seal with the outer periphery of a tube. The abrasive particles grip the outside surface of the tube and hold it against slipping out of the coupling. The area of the washer that does not have particles forms a seal with the tube to prevent leakage. The area having the particular grips the tube and prevents it from withdrawal from the coupling.

---

Figure 1:
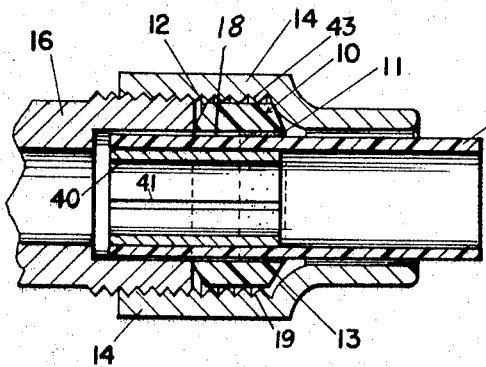

This invention relates to couplings and more, more particularly, to couplings for connecting two pieces of pipe together that are known as compression couplings having a sealing washer that also is a gripping means.

Various types and designs of compression couplings are available for connecting two pieces of pipe wherein one piece of the pipe is inserted in a resilient washer, which sealingly engages the piece of pipe when compressed between the two coupling members. These couplings are frequently used in applications where there is a tensile force between the two pieces of pipe and, as a result, the pipe that is inserted in the resilient washer is inclined to withdraw from the washer.

In the present invention, a rubber ring having an internal cyclindrical surface and an external cyclidrical surface is provided in a conventional type of compression fitting. The internal cyclindircal surface is coated over approximately half its inside length with an abrasive material which may be an abrasive grit of a size which will pass through a screen havng two hundred meshes per inch. This abrasive material prevents the pipe from being pulled out of the coupling while the resilient part of the washer forms a nearly perfect seal.

In testing this coupling, it was found that on large size pipes where pressures of 500 p.s.i., for example, were used for several days, the pipe backed out of the coupling. It was concluded that the pipe and rubber washer twisted during tightening of the nut. With the twist remaining on the rubber ring after tightening, the untwistng force gradually back the nut off and this loosened up the coupling. It was then decided that the outside surface of the rubber ring could be coated with grease or other slippery substance on the part bearing against the nut surface, and thus prevent the coupling from being untwisted. It was discovered that coating the inside of the nut with grease or other slippery substance solved the problem. Care should be taken to prevent lubricant getting on the inside surface of the ring.

It is, accordingly, an object of the present invention to provide an improved sealing washer.

Another object of the invention is to provide a sealing washer that is simple in construction, economical to manufacture, and simple and efficient to use.

Still another object of the invention is to provide an improved combination sealing washer and coupling.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
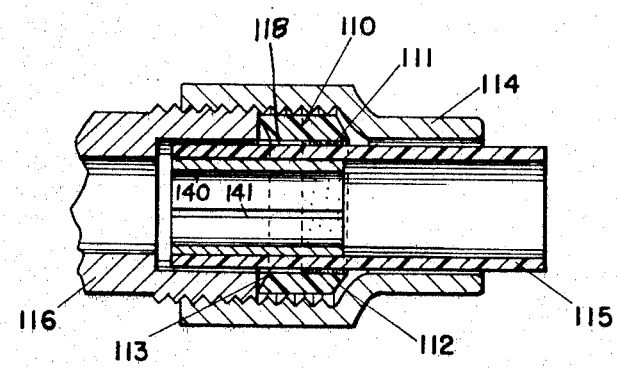

In the drawing:

FIG. 1 is a longitudinal cross sectional view of a coupling according to the invention; and FIG. 2 is a view of a coupling similar to FIG. 1.

Now with more particular reference to the drawing, the coupling shown in FIG. 1 has a first pipe part 14 and a second part 16 adapted to be threadably connected together and to connect a first pipe 15 to a second pipe part 16. The coupling has a counterbore that receives washer 10 and defines a space between parts 14 and 16 which receives the resilient washer 10. The resilient washer 10 has an external, generally cyclindrical peripheral surface that is received inside the threaded counterbore in the coupling part 14. The internal surface as shown may be generally cylindrical and it has a first part 11 with a cylindrical surface that has a grit coating. The grit may be an abrasive material of a size that will pass through a screen of 200 meshes per inch, for example. The second part 18 of the internal cylindrical surface will be uncoated and the resilient surface thereof may engage the outside surface of the pipe section 15. The ends of the washer have a slope of forty-five to sixty degrees.

It has been discovered that if the coupling disclosed herein is used with plastic pipe, it is sometimes necessary to provide a stiffening liner 49 inside the pipe. The stiffening liner may be made of brass or other suitable relatively rigid material and may be split at 41.

The stiffening liner 40 enables the plastic pipe to withstand the comprehensive forces exerted by the coupling over a long period of time. The stiffening liner has an outside diameter that is slightly larger than the inside diameter of the pipe 15.

It has been discovered that by applying a coating of grease at 43 to the external surface of the washer at 19 or inside the coupling part 14, the washer will not retain an internal twist when the coupling is tightened and the coupling will remain tightened better.

In the embodiment of the invention shown in FIG. 2, the coupling has parts 114 and 116, which are similar to corresponding coupling members in FIG. 1, and are connected together by threads as shown. The pipe part 115 extends through washer 110 and partly into the pipe part 116. The washer 110 has end surfaces 112 and another end surface 113 that are both inclined in the same direction as shown. An abrasive coating 111 covers approximately half of the internal periphery which is cylindrical as shown and the outer periphery of the washer is cylindrical likewise and is received in the internal threads of the coupling part 114. The washer 110 differs from the washer 10 in FIG. 1 in that the end surface 12 of the washer 11 slopes in a different direction from the slope of forty-five to sixty degrees of surface 113 of washer 110. The washer is parallelograms shaped in cross section.

When the coupling parts 114 and 116 are tightened, the washer 110 is compressed between them and the grit covered surface 111 is caused to grip the tube while the surface 118 forms a seal between the tube and the washer.

The coupling can be used in fluid or gas lines or in structural work.

In the embodiment of the invention shown in FIG. 2, the stiffening liner 140 is provided having slot 141 therein. This liner, like that shown in FIG. 1, is made of relatively rigid material having a slightly larger diameter than the diameter of the inside of the tube.

The foregoing specification sets forth the invention

The embodiments of the invention in which an exclusive property or privilege is claimed are defined as follows:

1. A sealing washer for a compression joint comprising:
    an annular washer,
    said washer being made of relatively resilient material,
    said washer having an internal surface divided into a first area extending over a part of the length of said washer and a second area extending over another part of the length of said washer around the entire periphery thereof,
    said first area having particles of an abrasive material embedded therein,
    said second area being made of a realtively smooth material adapted to sealingly engage a sealing surface on a tube,
    and a pair of axially spaced surfaces on said washer adapted to be engaged by a pair of axially movable members whereby said sealing surface and said particles are adapted to be forced into engagement with said tube.

2. The washer recited in claim 1 wherein said internal surface is generally cylindrical.

3. The washer recited in claim 1 wherein the outer periphery of said washer is cylindrical.

4. The washer recited in claim 1 wherein said washer has two end surfaces, said end surfaces being disposed at acute angles to the central axis of said washer.

5. The washer recited in claim 1 in combination with a coupling having a first part and a second part adapted to connect said tube to said second coupling part,
    and means connecting said first coupling part to said second coupling part,
    said tube part having an end portion received in said washer,
    said second coupling part having a shoulder engaging one end of said washer,
    said first coupling part having an end surface engaging another end of said washer,
    the outer periphery of said washer engaging an inner peripheral surface of said first coupling part,
    said coupling having means to compress said washer between said coupling parts and said tube part whereby said internal surface of said washer is forced into engagement with said tube part.

6. The washer recited in claim 1 wherein the external surface is coated with a lubricant material.

7. The washer recited in claim 5 wherein the external surface is coated with a lubricant material.

8. The combination recited in claim 5 wherein the end surfaces of said washer are inclined outward from each other and toward the center of said washer.

9. The combination recited in claim 5 wherein:
    a sleeve having an outside diameter slightly larger than the inside diameter of said tube is inserted in the end of said tube,
    said sleeve having a longitudinal split in one side thereof.

10. The combination recited in claim 5 wherein:
    said end surfaces of said washer are inclined parallel to each other and disposed at an angle of between forty-five and sixty degrees to the central axis of said tube.

References Cited

UNITED STATES PATENTS

| | | | |
|---|---|---|---|
| 3,325,195 | 6/1967 | Margis | 285—369 X |
| 1,334,682 | 3/1920 | Snell | 285—249 |
| 2,561,887 | 7/1951 | Risley | 245—388 X |
| 2,585,453 | 2/1952 | Gallagher et al. | 285—354 X |
| 2,617,672 | 11/1952 | Nichols | 287—126 X |
| 2,787,479 | 4/1957 | Burns | 285—354 X |
| 3,194,592 | 7/1965 | Boughton | 285—348 X |
| 3,239,247 | 3/1966 | Pickert | 285—94 |

FOREIGN PATENTS 261,891  9/1965  Australia.

THOMAS F. CALLAGHAN, *Primary Examiner.*

U.S. Cl. X.R.

285—249, 328; 277—227